United States Patent [19]

Caldwell et al.

[11] 3,710,112

[45] Jan. 9, 1973

[54] METHOD OF INDIRECTLY MONITORING THE OUTPUT OF A PULSED NEUTRON SOURCE

[75] Inventors: Richard L. Caldwell; Wyatt W. Givens, both of Dallas, Tex.

[73] Assignee: Mobil Oil Corporation

[22] Filed: May 18, 1970

[21] Appl. No.: 38,226

[52] U.S. Cl. ............................. 250/83.3 R, 250/83.1
[51] Int. Cl. ................................................ G01t 1/16
[58] Field of Search ......... 250/83.3 R, 43.5 FC, 84.5, 250/83.1

[56] References Cited

UNITED STATES PATENTS 3,034,008   5/1962   Soloway ........................ 250/83.1 X
3,133,195   5/1964   Jones et al. ........................ 250/83.1

*Primary Examiner*—James W. Lawrence
*Assistant Examiner*—Davis L. Willis
*Attorney*—William J. Scherback, Frederick E. Dumoulin, Arthur F. Zobal, Andrew L. Gaboriault and Sidney A. Johnson

[57] ABSTRACT

The specification discloses a borehole tool for assaying for uranium and having a pulsed neutron source of the accelerator type and a detector for detecting delayed fission neutrons. In operation, the source is periodically actuated to produce very short neutron bursts having a duration of a few microseconds or less. Located adjacent the source is a gamma-ray detector for detecting delayed gamma rays emitted from oxygen in the formations when irradiated with neutrons and resulting from the reaction $O^{16}(n,p)N^{16}\beta^{-}_{\rightarrow}O^{16} + \gamma$. These gamma rays are recorded to obtain an indirect measure of the neutron output produced by the source.

3 Claims, 1 Drawing Figure

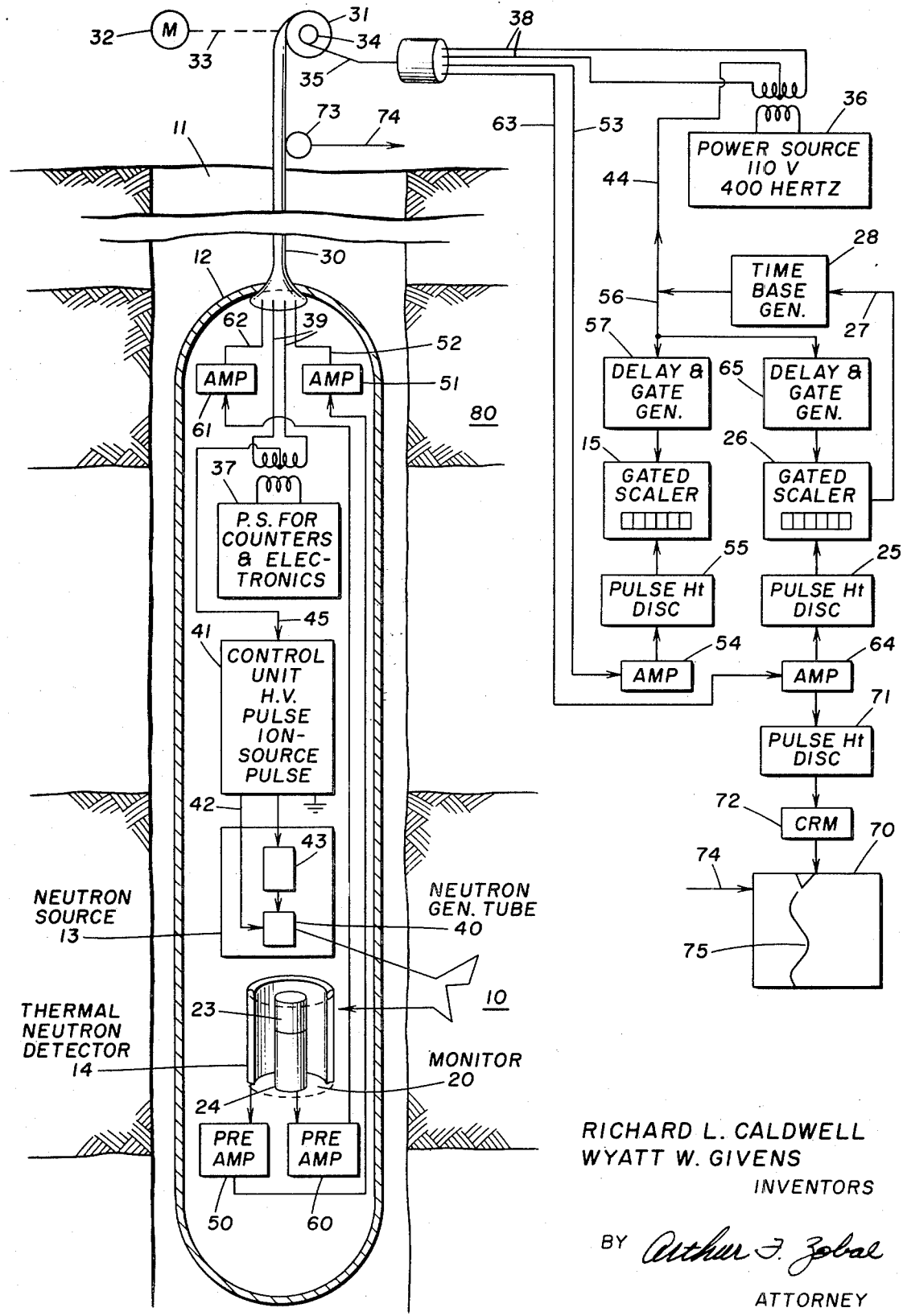

METHOD OF INDIRECTLY MONITORING THE OUTPUT OF A PULSED NEUTRON SOURCE

BACKGROUND OF THE INVENTION

In U.S. application Ser. No. 38,224, filed the same date as the present application by Wyatt W. Givens, Richard L. Caldwell, and William R. Mills, Jr., and entitled IN-SITU ASSAYING FOR URANIUM IN ROCK FORMATIONS, there is disclosed a borehole tool and recording system for obtaining a quantitative measure of the concentration of uranium in rock formations traversed by a borehole. The tool includes an accelerator-type neutron source which is periodically pulsed for the production of bursts of fast neutrons spaced in time. A thermal neutron detector is employed to detect neutrons resulting from the neutron fission of uranium. In operation of the source, it is pulsed to produce very short neutron bursts having a time duration of a few microseconds or less.

The output of an accelerator-type neutron source may vary during its operation. Hence, it is desirable to monitor the output to know that a constant output is produced during each assaying period or to correct or compensate for variations in the neutron output. The response time of a conventional fast neutron detector, however, is not fast enough to detect directly and measure accurately the number of neutrons produced by the source when it is being operated to produce neutron bursts having a time duration of a few microseconds or less.

SUMMARY OF THE INVENTION

In accordance with the present invention, the delayed gamma rays emitted from oxygen in the formations are detected and recorded to obtain an indirect measure of the neutron output produced by the source. The delayed gamma rays detected and measured are those produced from the reaction $O^{16}(n,p)N^{16} \xrightarrow{\beta^-} O^{16} + \gamma$.

BRIEF DESCRIPTION OF THE DRAWING

The FIGURE illustrates a borehole tool and recording system.

DESCRIPTION OF THE BOREHOLE ASSAYING SYSTEM AND OPERATION

Referring to the FIGURE, the formation to be investigated or assayed is shown at 10. It is traversed by a borehole 11. Of interest are a determination of whether uranium is present in the formation and, if so, a quantitative measure of the ore grade. The formation is found initially from the relatively high count rate on a natural gamma-ray log previously obtained in the borehole.

Assaying is carried out by lowering a borehole tool 12 into the borehole to the level of the formation 10. The tool 12 contains a pulsed neutron source 13 and a thermal neutron detector 14. In one embodiment, the source 13 is an accelerator-type source which produces 14-Mev neutrons. It is operated cyclically to produce bursts of fast neutrons spaced in time to irradiate the formation 10. In the formation matrix, many of the fast neutrons from the source are moderated or slowed to thermal energies. Both thermal and fast neutrons react with uranium, if present, for the production of delayed fission neutrons. These fission neutrons are slowed in the formation to thermal energies and are detected by the thermal neutron detector 14 which produces an output pulse for each neutron detected. The output of the detector 14 is transmitted to the surface to a gated scaler 15.

There are six groups of delayed neutrons emitted from fission of uranium by thermal or fast neutrons. They have half-lives of 55.72, 22.72, 6.22, 2.30, 0.61, and 0.23 second and a relative abundance, respectively, of 0.033, 0.219, 0.196, 0.395, 0.115, and 0.042.

In one embodiment, the source 13 and the scaler 15 are operated to emphasize the shorter-lived, delayed fission groups. In this respect, the source 13 may be operated to produce very short neutron bursts at a repetition rate within the range of from one to five bursts per second. In one embodiment, the source may be operated at two bursts per second, each burst having a duration of about 3 microseconds. Cyclic irradiation may be carried out for a period of about 5 minutes. During this time, the detector 14 may be operated continuously to detect thermal neutrons. The scaler 15 is operated to count only thermal neutrons detected between neutron bursts and beginning at a time period after the moderated neutrons from the source have died away, i.e., have been absorbed by the formation. In this respect, scaler 15 may be operated to begin counting at 5 milliseconds after each neutron burst and to continue counting until the beginning of the next neutron burst. It then stops counting, but begins counting again within the same corresponding time period during the next cycle. Counting by the scaler 15 also is carried out for about a 5 minute period. The numerical output of the scaler is a function of the number of uranium atoms per unit volume of the formation which are directly relatable to uranium ore grade.

DETAILED DESCRIPTION OF THE INVENTION

Located adjacent the neutron source 13 is a detector or monitor 20 for obtaining an indirect measure of the output from the pulsed neutron source 13. It is a conventional gamma-ray detector which is employed to detect the delayed gamma rays emitted from oxygen in the formations when irradiated with fast neutrons from the 14-Mev neutron source. The reaction is $O^{16}(n,p) N^{16} \xrightarrow{\beta^-} O^{16} + \gamma$. Nitrogen-16 decays by beta emission with a half-life of 7.14 seconds. The gamma rays emitted following beta decay predominantly are 6.14-Mev gamma rays and some 7.12-Mev gamma rays. The number of these gamma rays emitted are proportional to the number of fast neutrons produced by the source. In addition, they are emitted over a time period sufficient to allow representative counting by a conventional gamma-ray detector. The half-life, however, is short enough to allow assay operations to be carried out in an adjacent formation or section without requiring an undue delay in waiting for the background level to die out. Moreover, oxygen in the formations is plentiful and relatively constant. In this respect, it has been found that most formation matrices contain about 50 percent oxygen with the change in oxygen content between formations being about 7 to 8 percent. Thus, one may detect the delayed gamma rays from oxygen to obtain a representative measure of the neutron output produced by the source.

In one embodiment, the monitor 20 for obtaining an indirect measure of the neutron source output may comprise a low-Z, plastic scintillator 23 coupled to a photomultiplier tube 24. The output of the photomultiplier tube 24 comprises electrical pulses having heights proportional to the electron energy of Compton interaction by gamma rays. These pulses are transmitted to the surface to a pulse height discriminator 25. This discriminator is adjusted to pass only those pulses representative of radiation detected and having energy above 3 Mev or lightly higher. This is done to bias out the background radiation of lower energy. The output of the pulse height discriminator 25 is applied to a gated scaler 26 which records a count proportional to the number of neutrons produced by the source 13. Scaler 26 is enabled for counting between neutron bursts within the same period that scaler 15 is enabled for counting. It counts for about a 5-minute period. After the scaler 26 records a predetermined count, a control signal is applied by way of conductor 27 to turn OFF a time-base generator 28 which controls pulsing of the neutron source and counting by the gated scalers 15 and 26.

More details of the borehole and uphole system now will be described. The logging tool 12 comprises a steel housing which is supported by a cable 30. This cable is unwound and wound from and upon a drum 31 driven by motor 32 and connection 33 in order to lower and raise the tool 12 in the borehole. Slip rings and brushes illustrated at 34 and 35, respectively, are employed to couple the conductors of cable 30 to the various uphole equipment for the transmission of signals and voltages. Power from an uphole power source 36 is transmitted downhole to a downhole power supply 37 by way of conductors illustrated at 38, slip rings and brushes 34 and 35, and cable conductors illustrated at 39. For simplicity, connection is not shown between the downhole power supply 37 and the counters and other electronics.

In one embodiment, the pulsed neutron source 13 comprises a neutron generator tube 40 which contains a target and an ion source (not shown). Pulsing is carried out by applying a high voltage pulse (5 kilovolts in one embodiment) to the ion source and simultaneously a negative-going pulse (125 kilovolts in one embodiment) to the target. A source of this type is manufactured by Kaman Nuclear of Colorado Springs, Colo. The ion source pulse is generated by control unit 41 and applied to the ion source by way of conductor 42. In addition, the control unit 41 generates a negative pulse which is stepped to −125 kilovolts by transformer 43 and applied to the target. A trigger pulse generated uphole is applied periodically to actuate the control unit 41 for the production of the ion source and target pulses for pulsing the neutron generator tube 40. In this respect, the time-base generator 28 located uphole periodically generates a trigger pulse at the desired pulsing rate, for example, two pulses per second. This pulse is applied downhole to the control unit 41 by way of conductors 44, 38, 39, and 45.

The thermal neutron detector 14 preferably is a helium-3 detector. It may be cylindrical in form and of the type described in U.S. Pat. No. 3,359,443. In the alternative, there may be employed one or a plurality of helium-3 detectors of the type shown in U.S. Pat. No. 3,102,198. The output pulses of detector 14 are preamplified at 50, amplified by way of amplifier 51, and transmitted to the surface by way of conductor 52. At the surface, pulses from conductor 52 are applied to conductor 53, amplified at 54, and applied to pulse height discriminator 55 which biases out the background level and applies the pulses representative of thermal neutrons detected to the scaler 15. At the surface, trigger pulses from time-base generator 28 are applied by way of conductor 56 to delay and gate generator 57. This generator produces a gating pulse beginning about 5 milliseconds following termination of a neutron burst and lasting until the next trigger pulse. This gating pulse is applied to scaler 15 to enable the scaler for counting for the duration of the gating pulse.

The output of the photomultiplier tube 24 is amplified by amplifiers 60 and 61 and transmitted by conductor 62 to the surface to conductor 63. At the surface, the output pulses from the photomultiplier tube 24 are amplified by amplifier 64 and applied to pulse height discriminator 25. Delay and gate generator 65 periodically is actuated by the trigger pulses produced from time-base generator 28 for the production of a gating signal periodically to enable the scaler 26 to count between neutron bursts.

The scalers may be of the type manufactured by Canberra Industries, Model No. 1471, or Systems Development Incorporated, Model No. 5210 frequency counter.

During assaying operations, the photomultiplier tube 24 may be gated OFF during each period that the source 13 is producing neutrons. This will avoid gain shift due to the high intensity of neutrons and gamma rays produced during the neutron burst time. A gating pulse may be derived from the trigger pulse from conductor 45. The photomultiplier tube 24 is turned ON between neutron bursts to allow detection and measurement of delayed radiation from the oxygen in the formation.

The scintillator 23 and photomultiplier tube 24 perform a dual function of locating the formation 10 for carrying out the assaying operations. For example, the formation 10 is selected for assaying from the high count rate shown on a natural gamma-ray log previously obtained. The tool 12 then is lowered into the borehole 11 with the photomultiplier tube 24 in operation. Uphole, the output of scintillator 23 and photomultiplier tube 24 is applied to a continuous-trace recorder 70 by way of pulse height discriminator 71 and count rate meter 72. The chart of the recorder 70 is driven in correlation with depth of the tool 12 in the borehole. This is done by reel 73 and connection 74. Thus, as the tool 12 is lowered, the scintillator will detect natural gamma radiation which will be recorded by the recorder 70 as a continuous trace 75. The operator will observe the trace 75 and when there is recorded a high count rate corresponding to that recorded by the natural gamma-ray log previously obtained, the operator will know that the neutron source and the thermal neutron detector are at the level of the formation of interest. Lowering of the tool 12 will be terminated and assaying operations begun. The purpose of the pulse height discriminator 71 is to bias out the background level. In this respect, the discriminator may be adjusted to pass pulses representative of gamma radiation having energies above 0.1 Mev.

When a 14-Mev source is used, oxygen in the formation 10 will produce a neutron background level which contributes to the neutrons detected and counted by the scaler 15. When oxygen-17 is irradiated with neutrons of energy greater than 7.93 Mev, the following reaction takes place:

$$O^{17}(n,p)N^{17}\xrightarrow{\beta^-}O^{17}\rightarrow O^{16}+n. \quad (1)$$

The resulting neutrons produced have a maximum energy of about 2.2 Mev. Since the half-life of the beta decay is of the order of 4.14 seconds, these neutrons are produced within the same time period that the shorter-lived fission groups from uranium are produced. Thus, they contribute to the count obtained by the scaler 15. In low uranium ore grades, correction should be made for the oxygen background. The oxygen contribution is corrected by counting the oxygen background in a nonore-bearing formation and comparing this count with the total count obtained in the ore-bearing formation of interest. It is found that corrections may be obtained in this manner since there is little variation in the change of oxygen content from formation to formation within a given region as indicated above. In order to obtain the best estimate of oxygen background in the ore zone, a clean zone containing no neutron-fission-producing ores, and preferably close to the ore zone, is chosen to obtain oxygen background measurements. One such zone may be the formation illustrated at 80. In order to obtain the background measurements, the tool 12 is raised to locate the source 13 and the detector 14 at the level of the formation 80. The source 13, the monitor 20, and the scalers 15 and 26 then are operated in the same manner as that described with respect to the investigation of formation 10. The counts obtained by the scaler 15 then are observed and subtracted from those obtained in the investigation of the formation 10. It is to be understood that the background measurements may be obtained prior to or after the formation of interest is investigated.

What is claimed is:

1. A method of monitoring the output of a pulsed neutron source while operated in a borehole to investigate subsurface formations in uranium assaying, comprising the steps of:

locating said source in a borehole at the level of a formation of interest, periodically operating said source over an interval of time for the production of bursts of fast neutrons spaced in time for irradiating said formation, detecting radiation of interest resulting from the irradiation of said formation, recording said radiation of interest detected between neutron bursts during said interval of time, detecting the quantity of delayed gamma rays emitted from oxygen in said formation when irradiated with neutrons from said source and resulting from the reaction $$O^{16}(n,p)N^{16}\xrightarrow{\beta^-}O^{16}+\gamma, \text{ and}$$

recording the quantity of delayed gamma rays detected between neutron bursts during said interval of time to obtain a representation of the quantity of neutrons produced by said source during said interval.

2. The method of claim 1 wherein said interval of time is a predetermined time period.

3. The method of claim 1 wherein said interval of time is determined by the detection of a predetermined number of said delayed gamma rays.

* * * * *